UNITED STATES PATENT OFFICE 2,195,789

HYDRAZINE AND PROCESS OF PREPARING THE SAME

Max Schmid, Riehen, Switzerland, assignor to the firm Society of Chemical Industry in Basle, Basel, Switzerland No Drawing. Application April 26, 1939, Serial No. 270,248. In Switzerland April 9, 1936

2 Claims. (Cl. 260—510)

The present application is a continuation-in-part of my copending application Serial No. 134,452, filed April 1, 1937.

It has been found that a new hydrazine can be obtained by treating with a saponifying agent such as a strong acid, for example sulfuric acid, hydrochloric acid, phosphoric acid or benzenedisulfonic acid, the N-sulfo-derivative of the formula

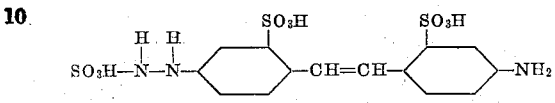

obtainable by careful reduction of the compound of the formula

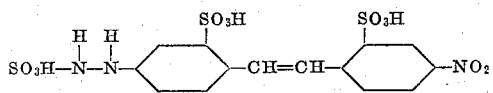

The new hydrazine of the formula

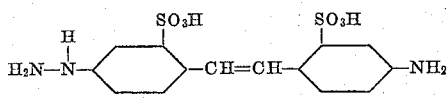

is a light powder which is soluble in alkalies and on the one hand combines the reaction of an aromatic amine and on the other hand the reaction of an aromatic hydrazine.

The following example illustrates the invention:

The solution of the sodium salt of the 4-hydrazino-(ω-sulfo)-4'-aminostilben-2:2'-disulfonic acid obtained according to Example 2 of application Serial No. 134,452, filed April 1, 1937, is boiled for a short time with dilute hydrochloric or sulfuric acid, if necessary after concentration, for the purpose of splitting off the sulfonic group in ω-position. After cooling, the 4-hydrazino-4'-aminostilben-2:2'-disulfonic acid which has precipitated is isolated. The new hydrazino-amino-sulfonic acid is a light colored compound which dissolves in dilute sodium carbonate solution to a yellowish solution.

What I claim is:

1. Process for the manufacture of a hydrazine, comprising treating the product of the formula

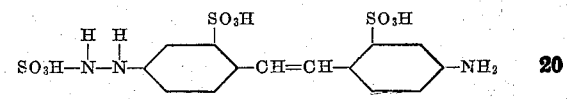

with a saponifying agent.

2. The aminohydrazine-disulfonic acid corresponding in the free state to the formula

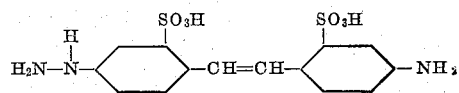

MAX SCHMID.